Patented Dec. 15, 1936

2,064,441

UNITED STATES PATENT OFFICE 2,064,441

PROCESS OF MAKING MANGANESE CHROMIUM STEEL

George P. Messenger, Chicago, Ill., assignor to Kensington Steel Company, Chicago, Ill., a corporation of Illinois No Drawing. Application April 29, 1935, Serial No. 18,873

7 Claims. (Cl. 75—127)

This invention relates to the production of manganese chrome steel, more particularly, steel of this type containing substantial quantities of manganese and chromium and relatively small quantities of carbon and silicon.

The primary objects of the invention are to reduce the cost of the manufacture of steels of this type and to insure the production of the metal substantially free from silica.

In practicing the invention chromite ore is used, as the primary source of chromium, instead of ordinary ferrochrome which contains too much carbon to be available without employing expensive steps for removing the excess carbon; or instead of a low carbon ferrochrome, the cost of which is excessive. Manganese, preferably ferromanganese, is used for reducing the chromite and a silicon reducing agent for reducing other metal oxides, particularly iron oxide. The manganese oxide, resulting from the reduction of the chromite ore and the reaction of the manganese with oxygen from other sources, combines with the silica in the iron, which may be present in considerable quantities if scrap iron is used, and with the silica resulting from the reduction of iron or other metal oxides, to form an insoluble manganese silicate which is fluid at the furnace temperatures used and is light in gravity so that the particles of this compound dispersed through the melt, readily coalesce and rise to the top of the melt and may, therefore, be removed from the metal with the rest of the slag. As a result, by using a quantity of manganese sufficient to give the desired manganese content in the alloy (which may be varied very considerably) and sufficient to reduce the chromite ore and to produce manganese oxide in proper ratio to the silica in the melt, a steel may be produced, in accordance with this method, which will be wholly free, for all substantial purposes, from silica.

The process is adapted for the use of metal scrap which, as a matter of economy, is the preferred source of the iron. Iron in the form of ingots or plates could be used.

The preferred method of practicing the invention is as follows:

(1) Metal scrap is melted in a basic lined electric furnace with chromite ore (FeO, $Cr_2O_3$) and ferromanganese (Fe, Mn). The preferred furnace temperature is in the neighborhood of 2850° F. Chromite ore is used in place of ferrochrome to reduce cost. The ordinary ferrochrome may contain as high as 6% of carbon which requires expensive operations to remove from the metal. The cost of low carbon ferrochromes is greater than that involved in the use and reduction of chromite ore in accordance with the present process.

The manganese reduces the chromite ore in the sense of the following equation:

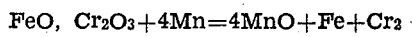
$$FeO, Cr_2O_3 + 4Mn = 4MnO + Fe + Cr_2$$

(2) There is then added to the melt a silicon reducing agent, preferably ferrosilicon, (Fe, Si), to reduce other oxides, particularly iron oxides, the reaction being as follows:

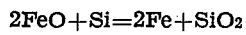
$$2FeO + Si = 2Fe + SiO_2$$

(3) The manganese oxide will now react with the silica to form manganese silicate in the sense of the following equation:

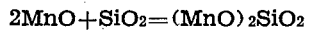
$$2MnO + SiO_2 = (MnO)_2 SiO_2$$

The reaction and resultant product are probably more complex than this. The reaction product may contain iron oxide, for example.

At the given temperature of the melt, or at any other workable furnace temperature, the manganese silicate thus formed will be in a fluid state, substantially insoluble in the metals of the melt and of a lower specific gravity than the same. The liquid particles of managese silicate, therefore, readily coalesce and are forced upwardly through the melt to the slag. Silica, on the other hand, is ordinarily a solid at furnace temperatures and is in small particles widely dispersed, and heavy enough so that they do not readily coalesce or rise to the top of the melt. By using manganese to reduce the chromite ore, and by using silicon, preferably at a later stage of the operation (since otherwise the silicon would be likely to react with the chromite before the manganese), manganese oxide is produced which will combine with the silica to provide a compound which is much more easily eliminated from the melt than is silica. The quantity of silica in the melt will depend upon the quantity of iron oxides reduced plus the amount of silica that there may be in the iron originally. These quantities may be considerable in case scrap iron is used. In order to accomplish fully the purpose of the invention manganese oxide must be produced in quantities sufficient to combine with substantially all of the silica in the melt and sufficient manganese must be used to this end in addition to that necessary to give the desired manganese content in the alloy. The manganese oxide for combination with the silica is derived from the reduction of the chromite ore, and possibly other metal oxides, and from the oxidation of the manganese by atmospheric oxygen, depending upon the extent to which air is admitted to or excluded from the furnace. The amount of manganese used, over and above the quantity desired in the finished alloy, that is to say, the manganese losses due to oxidation and combination with the silica, can be readily determined empirically for any given operation. Ordinarily the loss of manganese, in terms of total percentage of the batch, will be from 1% to 3%. That is, if a certain percentage of manganese is desired in the alloy, it will be necessary to charge into the furnace that percentage plus 1% to 3%.

(4) To increase the carbon content, additional ferromanganese may be added at stage (2). To increase the manganese content without increasing the carbon content silico manganese (MnSi) may be added preferably but not necessarily at this stage. To increase the chromium content chromic oxide ($Cr_2O_3$) may be added. The latter has a reaction with the silicon (of the ferrosilicon ingredient) in the sense of the following equation:

$$2Cr_2O_3 + 3Si = 4Cr + 3SiO_2$$

(5) Preferably there is added to the slag lime and coke and one or more of the following reducing agents: ferromanganese, aluminum, ferrosilicon, silico manganese, calcium silicide, titanium. The last mentioned two agents, however, are too expensive at present day prices to be of practical value. This treatment of the slag reduces the oxides therein allowing the metals to join the main body of the metal in the furnace. The following are typical examples of the alloys producible by the improved process of this invention, and of the formulas for producing said metals, respectively, the percentages being by weight:

Metal A

| | | |
|---|---|---|
| Manganese | 12 % | variable from 10% to 14% |
| Chromium | 3.5 % | variable from 2% to 4% |
| Carbon | 1.10% | variable from 1% to 1.3% |
| Silicon | 0.6 % | variable from 0.6% to 1.5% |
| Iron to make up | 100 % | |

Steels according to the above analysis, and within the variations specified, may be considered as austenitic steels. When the metal is properly heat treated, it will have an initial hardness on the Brinell scale of between 225 and 250. When cold worked, the hardness may be increased to something in the neighborhood of 500. These steels resist abrasion and shock and are used for dipper teeth, dipper fronts, jaws and plates for crushing apparatus, and like purposes.

The following is a specific example of a formula for making an alloy of the Metal A type.

| | Pounds |
|---|---|
| Scrap iron | 2100 |
| Chromite ore | 300 |
| Ferromanganese | 500 |
| Silico manganese | 50 |
| Ferrosilicon | 50 |
| Total | 3000 |

This will give approximately 2750 pounds of good clean metal. The hardness of the metal will be in the neighborhood of 230 Brinell when properly annealed. The manganese is about 14% of the batch, and the manganese content of the steel 12% so that there is a manganese loss of 2%.

Metal B

Analysis of the finished alloy:

| | | |
|---|---|---|
| Manganese | 1½% | variable from 1% to 2% |
| Chromium | 3 % | variable from 1% to 4% |
| Carbon | 0.45% | variable from 0.25% to 0.60% |
| Silicon | 0.40% | variable from 0.20% to 0.40% |
| Iron to make up | 100% | |

In both examples it will be understood that the carbon content will depend largely upon the amount of carbon in the iron.

Steels in accordance with the B type may be given heat treatment and quenching so that they will have an initial hardness of from 225 to 500 on the Brinell scale, depending upon the quenching medium used. The alloy is tough as well as hard and may be used for ball mill liners or other similar purposes.

The formula for making this metal, with the preferred percentages specified, is as follows:

| | Pounds |
|---|---|
| Iron | 2000 |
| Chromite ore | 200 |
| Ferromanganese | 75 |
| Ferrosilicon | 30 |

The above specific examples are not to be considered as limiting the invention. It is the intention to cover all modifications within the scope of the appended claims.

I claim:

1. Process of making manganese chrome steel containing a substantial quantity of manganese which comprises: first melting together iron, chromite ore and a manganese containing reducing agent which reduces the chromite ore with the formation of manganese oxide; and thereafter adding to the melt a silicon containing reducing agent in sufficient quantity to reduce iron oxides in the melt with the formation of silica; the manganese being introduced in sufficient quantity to provide the required manganese content in the finished alloy, to reduce the chromite ore and to provide sufficient manganese oxide to combine with substantially all of the silica in the melt, forming a manganese silicate compound, fluid at temperatures of the melt and of low gravity so that it will rise to the top of the melt and, by this operation, free the metal of deleterious oxides.

2. Process of claim 1 in which silico manganese is added to the melt to increase the manganese content of the alloy.

3. Process of claim 1 in which chromic oxide is added to the melt to increase the chromium content of the alloy.

4. Process of making manganese chrome steel containing a substantial quantity of manganese which comprises: first melting together iron, chromite ore and ferromanganese which latter reduces the chromite ore with the formation of manganese oxide; thereafter adding to the melt a silicon containing reducing agent in sufficient quantity to reduce iron oxides in the melt with the formation of silica; the manganese being introduced in sufficient quantity to provide the required manganese content in the finished alloy, to reduce the chromite ore and provide sufficient manganese oxide to combine substantially all of the silica in the melt, forming a manganese silicate compound, fluid at temperatures of the melt and of low gravity, so that it will rise to the top of the melt and remove said silicate compound from the melt.

5. Process of making manganese chrome steel which comprises melting together iron, chromite ore, and ferromanganese, and then adding to the melt enough ferrosilicon to reduce iron oxides; the ferromanganese being in quantities sufficient to give the required manganese content in the alloy, to reduce the chromite ore and to form a reaction product with the silica in the melt that will rise to the top of the melt so as to be removable from the metal with the rest of the slag.

6. Process of making chrome steel which comprises first melting together the following substances in the proportions substantially as follows: iron, 2100 pounds; chromite ore, 300 pounds; ferromanganese, 500 pounds; then adding to the melt ferro-silicon, 50 pounds; and including in the batch silico manganese, 50 pounds.

7. Process of making manganese chrome steel which comprises melting together the following substances in the proportions substantially as follows: iron, 2000 pounds; chromite ore, 200 pounds; ferromanganese, 75 pounds; and then adding to the melt ferrosilicon, 30 pounds.

GEORGE P. MESSENGER.